Dec. 8, 1931.   V. HENRI   1,835,985
APPARATUS FOR USE IN THE ANALYSIS OF VOLATILE LIQUIDS
Filed June 7, 1929
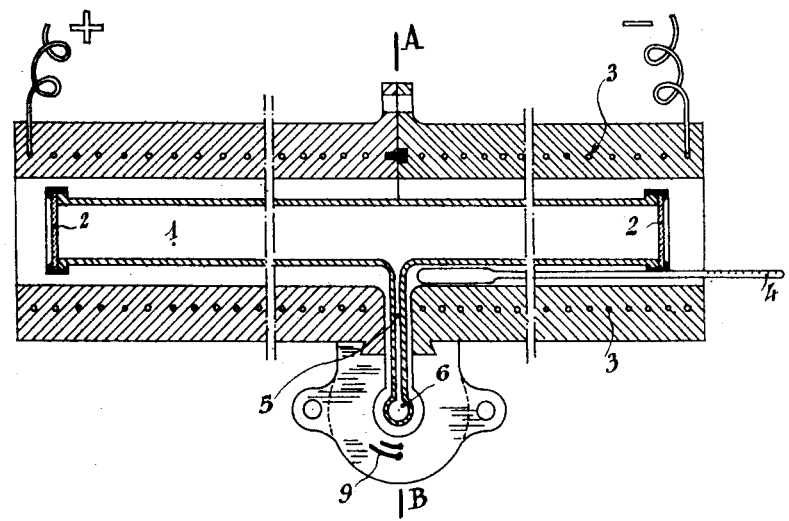
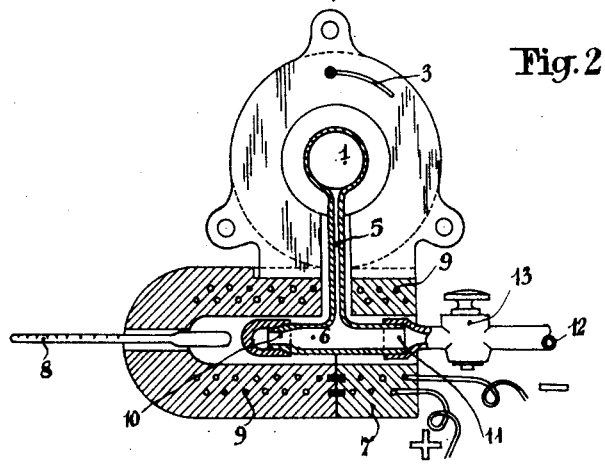
Victor Henri
Inventor Patented Dec. 8, 1931

1,835,985

UNITED STATES PATENT OFFICE

VICTOR HENRI, OF ZURICH, SWITZERLAND, ASSIGNOR TO URBAIN CORPORATION, OF NEW YORK, N. Y.

APPARATUS FOR USE IN THE ANALYSIS OF VOLATILE LIQUIDS

Application filed June 7, 1929, Serial No. 369,251, and in France June 11, 1928.

In an U. S. application filed on July 23rd, 1927, Ser. No. 207,912, in the name of Mr. Victor Henri, a process is described applicable to the majority of gases or vapours and adapted to determine the nature and the proportion of the consituents of a mixture of gas or of vapours, by the analysis of the absorption spectrum of the mixture.

The present invention relates to another apparatus suitable for use in connection with the said process in every case in which a liquid mixture can be totally volatilized without the constituents of the mixture being decomposed, which in a large number of cases is possible only by operating at a suitably reduced pressure. Frequently it will also be advisable to proceed in stages with the volatilization of the liquid by evaporating it in successive portions so as to separate partly the constituents. In that way it will be possible to show the different constituents more clearly.

The apparatus hereinafter described enables all these operations to be easily carried out in an exact manner with a small sample of the substance to be analyzed, and it is illustrated by way of example in the accompanying drawings, in which Figure 1 is a longitudinal section, and Figure 2 is a cross section on line A—B of Figure 1.

The apparatus is constituted by a tube 1 hermetically closed at its two ends by windows 2, 2 of quartz or other material transparent in the zone of the spectrum to be examined. This tube is surrounded by a suitably heat-insulated heating resistance 3 by means of which (by operating for instance a rheostat) the tube can be brought to a known constant temperature controlled by a suitable thermometric device such as is known in the art, or the temperature may be controlled by adjusting the flow of the electrical current while watching the temperature through the medium of an appropriate instrument as the thermometer 4. As will be shown from Figure 1, the heating resistance is held at a certain distance from the tube 1 so that the heat shall be uniformly distributed owing to the intermediate layer of air.

The heating resistance 3 affords a passage for a pipe 5 through which the vapours to be examined are introduced into the tube 1. This pipe 5 terminates at the other end in a chamber 6 of a small electric heater 7 which may be provided, like the first, with a suitable thermometric device for the control of the temperature of the heater 7, or as stated above, the temperature may be controlled by adjusting the flow of the electrical current in any desired way while watching the temperature through the medium of an appropriate instrument such as the thermometer 8.

The winding 9—9 of the heater 7 is divided into two parts, one of which is movable and makes it possible to disengage or uncover the chamber 6 at its end 10 which is closed by grinding and through which is introduced in a small bulb of thin glass the liquid to be examined. The other end 11 of the chamber 6 is extended by a pipe 12 provided with a cock 13 and connected to a pump or to any other apparatus by means of which a good vacuum can be produced both in the chamber 6 and in the tube 1 through the pipe 5.

The operations take place in the following manner:

The tube 1 having been placed in the path of the beam emitted by the source chosen, and analyzed by the spectral apparatus, is raised to a fixed temperature which is high enough to prevent the vapours of the liquid to be analyzed from condensing. The thin glass bulb containing the substance to be analyzed has been previously introduced into the chamber 6. A vacuum is then produced in the apparatus, the cock 13 is closed, and the bulb is broken, for instance by dropping it with a hard heavy body contained in the chamber 6, which can be easily done by turning the whole apparatus round the axis of the tube 1 at right angles to the axis of the chamber 6. The temperature of the chamber 6 is then gradually raised in order to produce a slow evaporation of the liquid, and the successive spectra of absorption of the gaseous phase more and more rich in products with a high boiling point, are examined.

When the evaporation is finished, and the temperature of the chamber 6 is equal at least to that of the tube 1, the quantitative measurements are effected, which are greatly facilitated by the preceding determinations.

It must be pointed out here that in the case of organic vapours and of a large number of mineral vapours, the coefficient of absorption in the ultra-violet zone is sufficiently great to enable the tube 1 to be made of a reduced length, so that its handling is greatly facilitated. As a rule, a 300 mm. thickness of vapours will be sufficient in most cases. It is only when the volatilization without decomposition of the substance to be examined necessitates exceedingly low pressures that it will be necessary to employ materially longer tubes. The above description of an apparatus according to the invention, and of the method of using it, will make the exact general definition of the invention much clearer.

The invention consists in the combination of a chamber absorbing rays of light, the temperature of which can be regulated at will, with an evaporation chamber distinct from the former and also of a temperature which can be regulated at will and independently of that of the first chamber, the whole enabling the spectrum of vapours of a liquid to be examined successively during its evaporation and after its total evaporation and at an arbitrary pressure.

What I claim is:

1. An apparatus for use in the analysis of volatile liquids by means of the absorption spectrum of their vapours, comprising a tube, windows of material transparent in the zone of the spectrum to be examined for closing the ends of the tube forming a chamber for absorbing rays of light, a heat insulated heating resistance held at a certain distance from and around the said tube, electrical connections for said resistance whereby the temperature of the tube may be controlled, a small electric heater, an evaporation chamber within the said electric heater, electrical connections for said electric heater whereby the temperature of the evaporation chamber may be controlled, a pipe connecting together the absorption chamber and the evaporation chamber and a second pipe connected to one end of the evaporation chamber for producing a vacuum both in the latter chamber and in the above tube.

2. An apparatus comprising a tube adapted to be rotated about its axis, windows of material transparent in the zone of the spectrum to be examined for closing the ends of the tube forming a chamber for absorbing rays of light, a heat insulated heating resistance held at a certain distance from and around the said tube, electrical connections for said resistance whereby the temperature of the tube may be controlled, a small electric heater, an evaporation chamber within the said electric heater, the axis of the above tube and evaporation chamber being at right angles to each other, electrical connections for said electric heater whereby the temperature of the evaporation chamber may be controlled, a pipe connecting together the absorption chamber and the evaporation chamber and a second pipe connected to one end of the evaporation chamber for producing a vacuum both in the latter chamber and in the above tube.

In testimony whereof I hereunto affix my signature.

VICTOR HENRI.